United States Patent [19]

Ito et al.

[11] Patent Number: 5,250,794
[45] Date of Patent: Oct. 5, 1993

[54] APPARATUS FOR MOUNTING CARD-LIKE INFORMATION RECORDING MEDIUM

[75] Inventors: Junichiro Ito, Akishima; Tsuyoshi Togawa, Hino, both of Japan

[73] Assignee: Olympus Optical Co., Ltd., Tokyo, Japan

[21] Appl. No.: 677,397

[22] Filed: Apr. 1, 1991

[30] Foreign Application Priority Data

Oct. 1, 1990 [JP] Japan .................. 2-260512

[51] Int. Cl.$^5$ ............................. G06K 13/08
[52] U.S. Cl. .................... 235/479; 235/486
[58] Field of Search .......... 269/254 R; 235/479, 235/486; 40/362, 361, 366, 156; 353/95

[56] References Cited

U.S. PATENT DOCUMENTS

| | | | |
|---|---|---|---|
| 3,554,638 | 1/1971 | Dimitracopoulos | 353/95 |
| 4,733,572 | 3/1988 | Kobayashi | 235/479 |
| 4,800,258 | 1/1989 | Suzuki et al. | 235/479 |
| 4,802,027 | 1/1989 | Talmadge et al. | 235/486 |
| 5,099,111 | 3/1992 | Takakura et al. | 235/486 |

FOREIGN PATENT DOCUMENTS 73934 5/1982 Japan ................. 269/254

OTHER PUBLICATIONS

Webster's New World Dictionary, Second College Edition, 1972, p. 530.

*Primary Examiner*—John Shepperd
*Attorney, Agent, or Firm*—Stevens, Davis, Miller & Mosher

[57] ABSTRACT

A shuttle for mounting a card-like information recording medium for use in an information recording/reproducing apparatus in which the card-like information recording medium is relatively moved with respect to an information recording/reproducing head to record information on the medium and/or reproduce information therefrom, in which a condition that the card-like information recording medium is held between a plate member and counter members is easily released with the aid of rollers for use in feeding the card-like information recording medium or projections formed on the plate member and/or counter members. Therefore, it is possible to decrease a load which acts on a loading motor for driving the rollers to insert and remove the card-like information recording medium in and from the shuttle; in addition to this, the loading motor can be made compact.

4 Claims, 7 Drawing Sheets

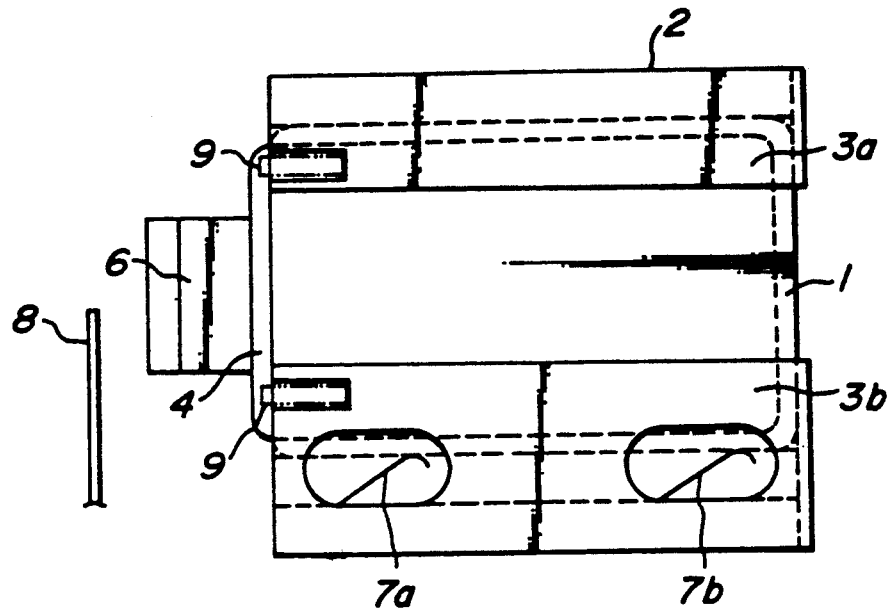
FIG_1
PRIOR ART
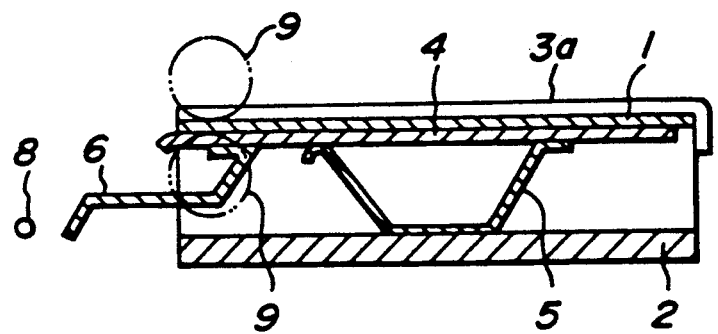
FIG_2
PRIOR ART

FIG_3
PRIOR ART
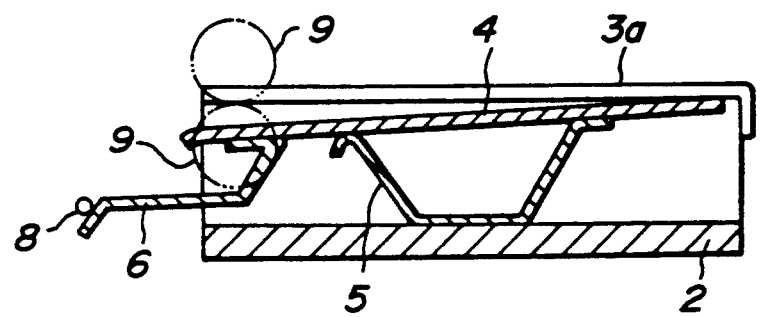
FIG_4
PRIOR ART
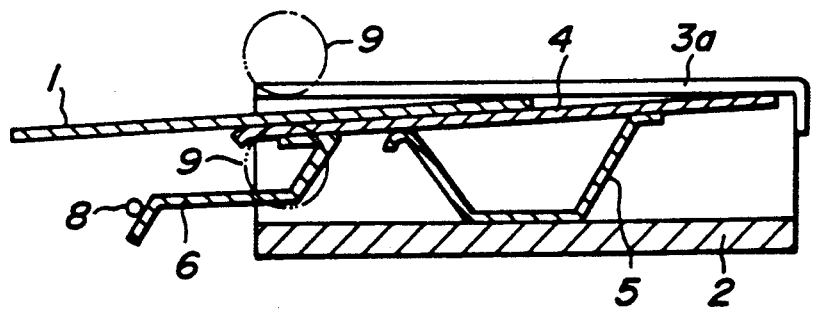

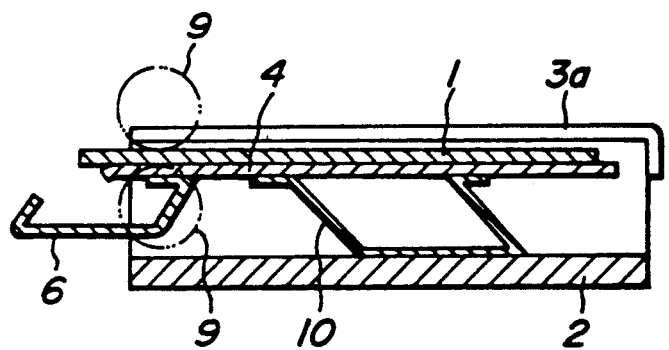
FIG_7
PRIOR ART
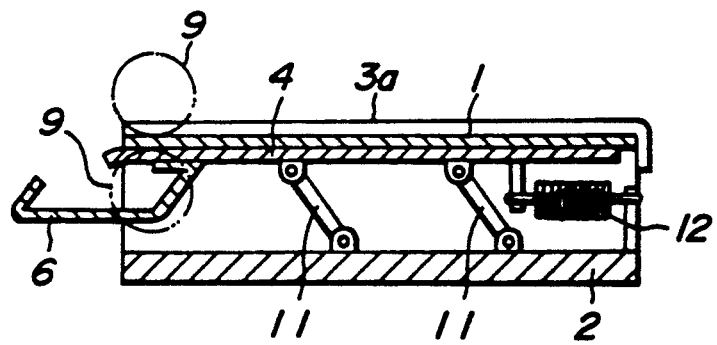
FIG_8
PRIOR ART

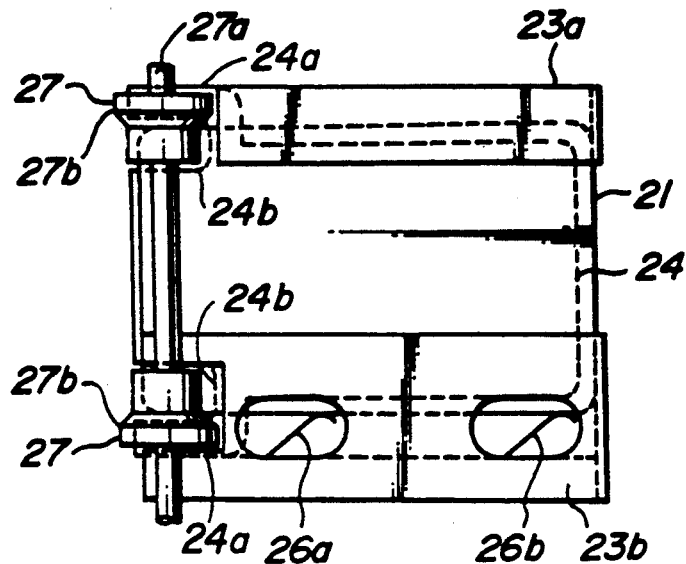
FIG_9
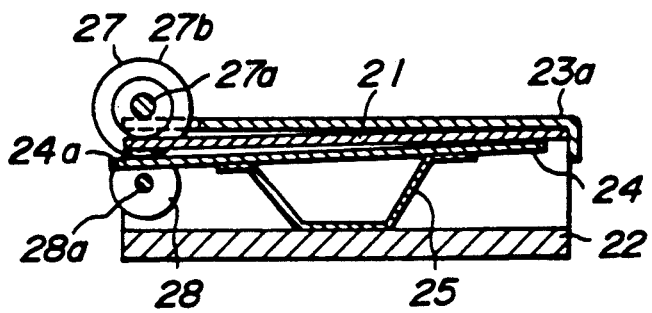
FIG_10
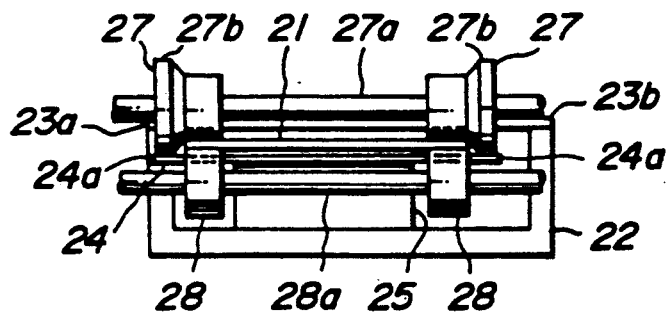
FIG_11

FIG._12
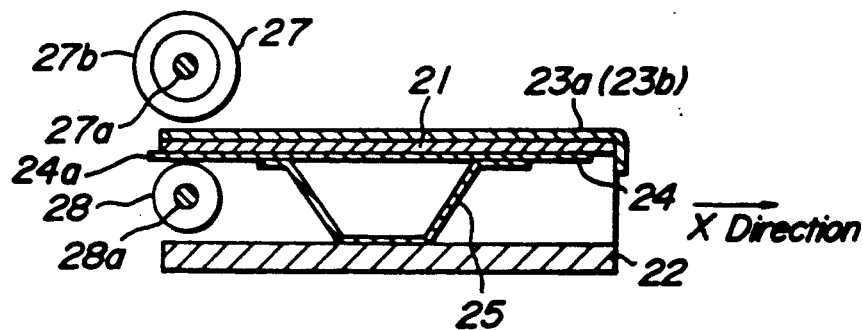
FIG._13
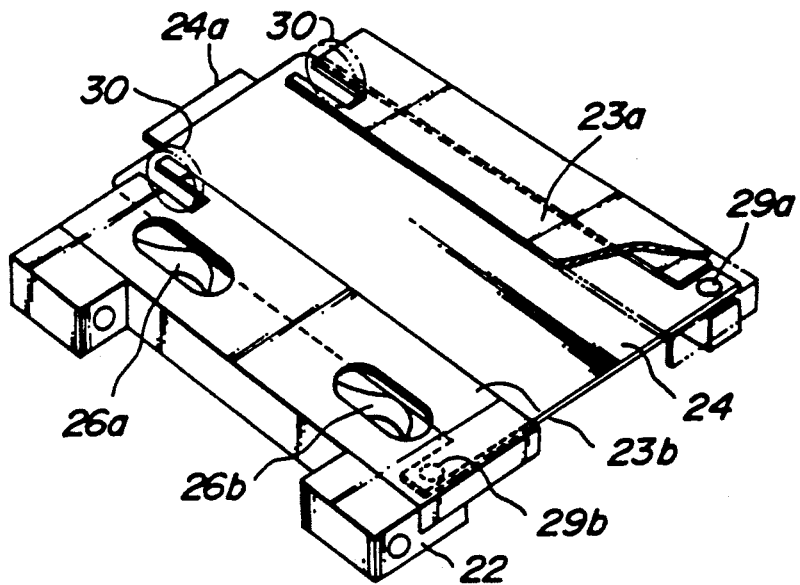
FIG._14
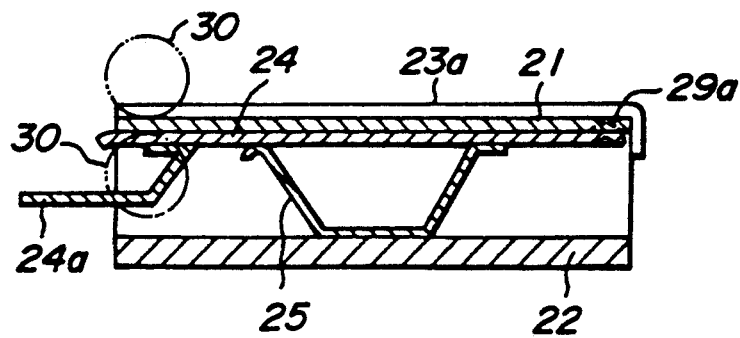

FIG._15
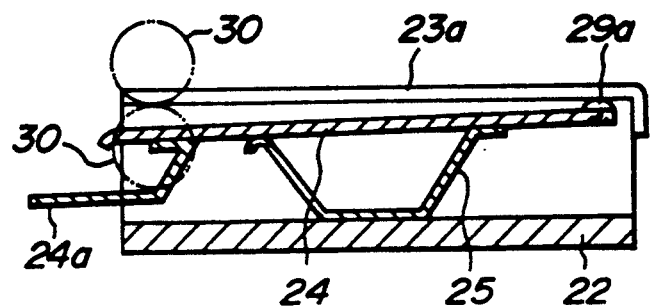
FIG._16
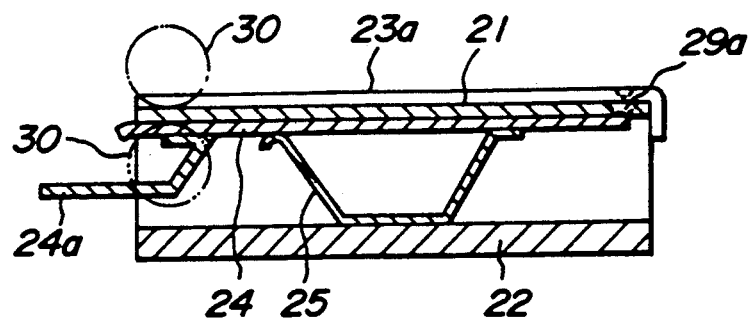

APPARATUS FOR MOUNTING CARD-LIKE INFORMATION RECORDING MEDIUM

BACKGROUND OF THE INVENTION

1) Field of the Invention

The present invention relates to an apparatus for mounting a card-like information recording medium, which is for use in information recording/reproducing apparatus in which a card-like information recording medium, such as an optical card and optomagnetic card, is relatively moved with respect to an information recording/reproducing head in a reciprocal manner to record information on the card-like recording medium and/or reproduce information therefrom.

2) Prior Art Statement

In recent years, an information industry has developed remarkably, and therefore, the amount of information dealt with by the information industry is increasing more and more. Under such conditions, the card-like information recording medium is widely used in the information industry since a great amount of information can be brought with the card-like information recording medium, such as the optical card and the optomagnetic card.

In the information recording/reproducing apparatus, in which the card-like information recording medium is used, it is desired to provide a mechanism for correcting a warp of the card-like information recording medium in the apparatus for mounting the card-like information recording medium (hereinafter the apparatus will be referred to as "shuttle") arranged in the information recording/reproducing apparatus. Because the card-like information recording medium, such as an optical card or an optomagnetic card, is always brought by users, it is often warped. Additionally, the mechanism for correcting the warp of the card should be arranged in the shuttle such that a condition for holding the card can be released when the card is inserted into the shuttle and removed therefrom, in order to decrease a load of a loading motor, by which the card is inserted into the shuttle and removed therefrom, and to prevent any abrasion of the card.

FIGS. 1 to 3 are schematic views showing a construction of a conventional shuttle; FIG. 1 is a plan view of the shuttle, FIG. 2 is a cross-sectional side view showing a condition that a card 1 is mounted in the shuttle, and FIG. 3 is a cross-sectional side views showing a condition that the card 1 has been removed from the shuttle and a holding means for holding the card 1 is released.

The conventional shuttle shown in FIGS. 1 to 3 comprises a base 2; counter members 3a and 3b; a plate member 4 which is arranged on the base 2 via an elastic member 5 and urged against the optical card 1 held between the plate member 4 and the counter members 3a and 3b by means of the elastic member 5; said plate member 4 comprises a lever 6 which serves to lift down the plate member 4 by means of a pin 8, which is arranged in the shuttle to be engaged with the plate member 4, when the card 1 is inserted into and removed from the shuttle; elastic members 7a and 7b arranged on one of side walls of the base 2, and the card 1 is urged against the other side wall of the base 2 thereby, so that the position of the card 1 is determined in a width direction of the card 1. When card 1 is inserted into the shuttle, the card 1 is put between the plate member 4 and the counter members 3a and 3b and is urged against the counter members 3a and 3b by the elastic member 5 via the plate member 4. It should be noted that the counter members 3a and 3b are arranged so as not to be made contact with an optical information recording area of the optical card 1 in order to prevent that the optical information recording area of the card is harmed by the counter members.

In the conventional shuttle, when the optical card 1 is inserted into and removed from the shuttle, the lever 6 is lifted down by means of the pin 8 against a force of the elastic member 5. By the movement of the lever 6, the plate member 4 is lifted down to be inclined with respect to the counter members 3a and 3b, so that the resistance generated on the optical card 1 is decreased when the optical card is inserted into and removed from the shuttle; thereafter the card 1 is fed into and from the shuttle smoothly by rotating a roller 9, which is driven by a loading motor (not shown). And, after the optical card 1 is mounted on the shuttle perfectly, the optical card 1 is urged against the counter members 3a and 3b by the plate member 4, which is supported by the elastic member 5, to be held between the counter members 3a and 3b and the plate member 4 in a tight manner; and thus the warp of the optical card is corrected by the counter members 3a and 3b and the plate member 4.

However, in the conventional shuttle, since the plate member 4 comprise the lever 6 and the lever 6 is arranged to be projected beyond a range between which the card is reciprocally moved with respect to an optical head (not shown) in order to record/reproduce information on/from the card, there is a drawback that the whole length of the shuttle should become long, and thus the information recording/reproducing apparatus as a whole could not be made compact.

Further, there is another drawback that when the shuttle is driven out of control, there is a possibility that the lever 6 collides against the engage pin 8 and they are destroyed. Furthermore, when the shuttle is driven out of control and the lever 6 collides against the engaged pin 8, the plate member 4 is lifted down and the card would not be held in the shuttle so tightly, therefore the card 1 would jump out from the shuttle.

In order to prevent the above-mentioned drawbacks, it can be considered that the engaged pin 8 is arranged so as to be projected only when the card 1 is being inserted into and being removed from the shuttle. However, if the pin 8 is arranged so, another power source for driving the pin 8 would be necessary and thus the cost therefor would be increased.

On the other hand, in the conventional shuttle, when the card 1 is inserted into and removed from the shuttle, the plate member 4 is lifted down, so that resistance generated between the card 1 and the counter members 3a and 3b and resistance between the card 1 and the plate member 4 are decreased to some degree. However, when the card 1 is positioned more inside than the position shown in FIG. 4, in other words, under the condition that a half or more of the card is left between the counter members 3a and 3b and the plate member 4, the effect that the resistances are decreased to some degree could not be obtained longer only by lifting down the plate members 4. Because although the plate member is lifted down, the distance between the plate member 4 and the counter members 3a and 3b is smaller than the thickness of the card 1 in the right half portion of the shuttle. Therefore, there is a drawback is that it does not prevent the increase of the load of the loading motor for driving the roller 9 and the abrasion of the card in an effective manner.

Furthermore, in order to mount the card 1 on a predetermined position of the shuttle, it is necessary to make a pressing force of the elastic members 7a and 7b against the card 1 larger than the friction generated between the card 1 and the counter members 3a and 3b and between the card 1 and the plate member 6. Therefore, the card 1 is pressed so much in the width direction by the elastic members 7a and 7b that the flatness of the card 1 cannot thereby be maintained.

In order to solve this problem, the present applicant discloses improvements of shuttle in Japanese Patent Preliminarily Publication Tokkai-Hei 2-144686. One of the improvements is shown in FIGS. 5 to 8 in which the elastic member 10 for urging the plate member 4 against the card 1 is arranged such that the plate member 4 is parallelly deviated in a vertical direction more than the thickness of the card 1 with respect to the counter members 3a and 3b. And the other improvement is illustrated in FIG. 8 in which the plate member 4 is held on the base 2 via a link mechanism 11 and urged against the count members 3a and 3b by means of a coil spring 12; so that the plate member 4 can be parallelly deviated in a vertical direction more than the thickness of the card 1 with respect to the count members 3a and 3b, as well as the first improvement.

It should be noted that FIG. 5 is a plan view showing the first improvement of the shuttle and FIGS. 6 and 7 are cross sectional side views thereof; FIG. 8 is a cross sectional side view depicting the second improvement of the shuttle.

In such constructions of the shuttle shown in FIGS. 5 to 8, since the plate member 4 can be lifted down more than the thickness of the card 1 when the card 1 is inserted into and removed from the shuttle by rotating the roller 9, it is possible to prevent the increase of the load in the loading motor and the abrasion of the card 1.

However, in accordance with the experiments conducted by the present inventors, it is proved that some points to be improved still remains in the shuttles explained in the above. That is to say, in the first improvement of the shuttle shown in FIGS. 5 to 7, there is a drawback that the elastic member 10 is sometimes bent to a non-desired direction due to the dimensional accuracy or the mounting accuracy of the elastic member 10 and due to the direction toward which the lever 6 is lifted down. Further, in the shuttle illustrated in FIG. 8, since there is provided the link mechanism 11 in addition to the coil spring 12, the weight of the shuttle as a whole becomes so heavy that the load which acts on a driving motor for driving the shuttle is increased.

SUMMARY OF THE INVENTION

The present invention has for its object to provide an apparatus for mounting a card-like information recording medium, in which the condition that the card-like information recording medium is held in the shuttle is easily released; and to provide an apparatus, in which it can be prevent certainly to increase the load generating in the loading motor and prevent the abrasion of the card-like information recording medium generated when the card-like information recording medium is inserted into the apparatus and removed therefrom without making the weight of the apparatus heavy and without making the construction of the apparatus complex.

In order to carry out the object of the present invention, the first aspect of the apparatus for mounting the card-like information, for use in an information recording/reproducing device, in which information is recorded on and/or reproduced from the card-like information recording medium by moving the apparatus mounting the card-like information recording medium thereon with respect to an information recording/reproducing head in a reciprocal manner, comprises:

feeding means for feeding the card-like information recording medium into a predetermined position in the apparatus and removing therefrom; and holding means for holding said card-like information recording medium to keep a flatness of the card-like information recording medium and preventing a deviation of said card-like information recording medium from said predetermined position in said apparatus;

card holding operation and card releasing operation conducted in said holding means being carried out in connection with a card feeding operation conducted by said feeding means.

According to the first aspect of the invention, since it is arranged such that the card holding operation and the card releasing operation are conducted in connection with the card feeding operation for inserting the card-like information recording medium into the apparatus and removing therefrom, the construction of the apparatus can be made compact and the card-like information recording medium can be inserted into the apparatus and removed therefrom without wasting large energy.

The second aspect of the apparatus for mounting the card-like information recording medium according to the invention, in which an apparatus for mounting a card-like information recording medium for use in an information recording/reproducing device, in which information is recorded and/or reproduced from the card-like information recording medium by moving relatively the apparatus mounting the card-like information recording medium thereon with respect to an information recording/reproducing head in a reciprocal manner; comprises:

feeding means for inserting said card-like information recording medium into said apparatus and removing therefrom;

counter members for determining a position of said card-like information recording medium;

plate member for holding said card-like information recording medium in conjunction with said counter members, being urged against said counter members via an elastic member;

moving means for deviating said plate member against a force of the elastic member so as to separate a card insertion end thereof from said counter members; and projected members being arranged at end portions opposite to the card insertion end of the plate member and/or said counter members, having thicknesses a little bit lower than a thickness of said card-like information recording medium.

In accordance to the second aspect of the invention, the space having a thickness, which is a little bit larger than the thickness of the card-like information recording medium, is formed between the plate like member and the counter members by means of the projections, when the card-like information recording medium is inserted into and removed from the apparatus. Therefore, it is possible to decrease the load, which acts on a loading motor for feeding the card-like information recording medium into/from the shuttle, and to prevent certainly the abrasion of the card-like recording medium, without making the weight of the apparatus heavy.

BRIEF DESCRIPTION OF THE DRAWINGS

FIG. 1 is a plan view showing a conventional shuttle for mounting a card-like information recording medium;

FIG. 2 is a cross sectional side view depicting the conventional shuttle shown in FIG. 1 in a condition that the card-like information recording medium is held between a plate member and counter members thereof;

FIG. 3 is a cross sectional side view illustrating the conventional shuttle shown in FIG. 1 in a condition that a plate member is lifted down;

FIG. 4 is a cross sectional side view representing the conventional shuttle shown in FIG. 1 in a condition that the card-like information recording medium is being inserted thereinto;

FIG. 7 is a cross sectional side view illustrating the conventional shuttle shown in FIG. 2 in a condition that the plate member is lifted down;

FIG. 8 is a cross sectional side view illustrating another conventional shuttle in which a link mechanism is provided therein instead of an elastic member shown in the above mentioned conventional shuttles;

FIG. 9 is a plan view representing a first embodiment of the apparatus for mounting a card-like information recording medium according to the present invention;

FIG. 10 is a cross sectional side view showing the first embodiment represented in FIG. 9 in a condition that the card-like information recording medium is being inserted into the apparatus;

FIG. 11 is a front view depicting the apparatus according to the first embodiment of the invention;

FIG. 12 is a cross sectional side view illustrating the first embodiment of the apparatus in which the card-like information recording medium is held between the plate member and the counter member;

FIG. 13 is a perspective view representing a second embodiment of the apparatus for mounting a card-like information recording medium according to the invention;

FIG. 14 is a cross sectional side view showing the second embodiment of the apparatus in which the card-like information recording medium is held between the plate member and the counter member;

FIG. 15 is a cross sectional side view depicting the second embodiment of the apparatus in which the plate member is lifted down; and FIG. 16 is a cross sectional side view illustrating the third embodiment of the apparatus according to the invention.

DETAILED EXPLANATION OF THE PREFERRED EMBODIMENTS

Figure 5:
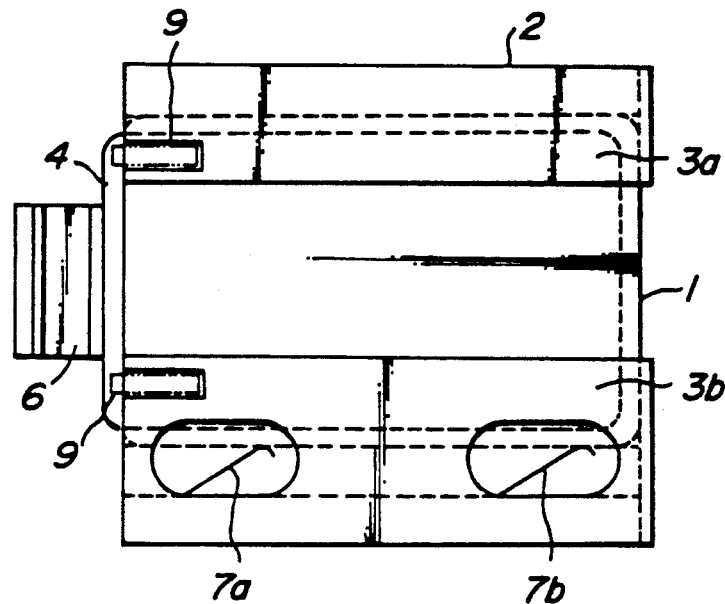
FIG. 5 is a plan view showing another conventional shuttle for mounting a card-like information recording medium.
Figure 6:
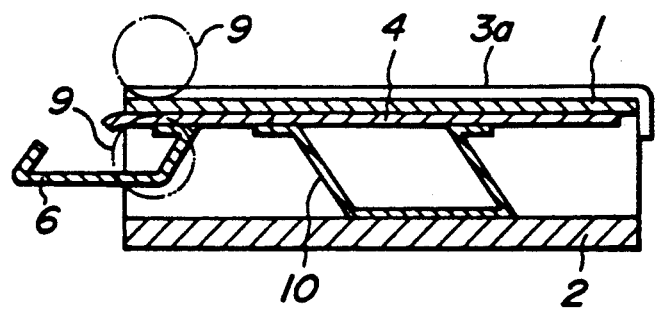
FIG. 6 is a cross sectional side view depicting the conventional shuttle shown in FIG. 2 in a condition that the card-like information recording medium is held between the plate member and the counter members thereof.

FIGS. 9 to 12 are schematic views showing the first embodiment of the shuttle according to the present invention; FIG. 9 is a plan view of the shuttle, FIG. 10 a cross sectional view thereof in which an optical card 21 is being inserted into the shuttle, FIG. 11 is a front view showing the shuttle shown in FIG. 9, and FIG. 12 is a cross sectional view of the shuttle in which the optical card 21 is held in the shuttle in a tight manner.

On an upper surface of a base 22 are arranged counter members 23a and 23b and a plate-like member 24 for holding an optical card 21 therebetween in such manner that an information recording area formed on the optical card 21 is not in contact with the counter members 23a and 23b. After the card 21 is inserted into the shuttle, the card 21 is urged against lower surfaces of the counter members 23a and 23b by means of a flat spring 25 via a plate member 24, as shown in FIG. 12. The card 21 is further supported by elastic members 26a and 26b in a width direction in order to determine its position. It should be noted that when the card 21 is inserted into and removed from the shuttle, the shuttle is fixed at a predetermined position of an information recording/reproducing apparatus by a shuttle locking mechanism (not shown).

As clear from FIG. 9, the plate member 24 comprises projected portions 24a at one end thereof. And thus cut off portions 24b are formed between the plate member proper and the projected portions 24a.

On both cut off portions 24b of the plate-member 24, are provided a first set of rollers 27, whose shaft 27a is arranged on side walls (not shown) of the apparatus to be movable in up and down direction; and under both cut off portions 24b are provided a second set of rollers 28, whose shaft 28a is secured to the side walls. It should be noted that the first set of rollers 27 comprises flange portions 27b, which are arranged to be positioned on the projected portions 24b of the plate member 24; and the second set of rollers 28 is made of rubber. When the card 21 is inserted in the shuttle, both sides of the card 21 are put between the first rollers 27 and the second set of rollers 28; and fed into the shuttle by rotating the first and second rollers.

The functional operation of the first embodiment will be explained in the following. FIG. 12 shows the condition that the card 21 is mounted on the shuttle. The shuttle mounting the card 21 thereon is reciprocally moved in an X direction to record/reproduce information on/from the card 21 with the aid of an optical head (not shown). During the period that the shuttle is reciprocally moved in the X direction, the first rollers 27 and the second rollers 28 are separated from each other as shown in FIG. 12, so that the first rollers 27 and the second rollers 28 do not make contact with the plate member 24 and the card 21. When the card 21 is inserted into the shuttle and removed therefrom, the first rollers 27 are moved in the lower direction as shown in FIG. 10; the first roller 27 push down the card 21 to put the card 21 between the first rollers 27 and the second rollers 28. At the same time, the flange portions 27b push down the plate member 24 to separate the card 21 from the plate member 24. When the card 21 is inserted into the shuttle and removed therefrom under such condition, since the force of the flat spring 25 is received by the flange portions 27b of the first rollers 27, the force does not act on the card 21, so that the card 21 is transferred to be inserted or removed with a small friction. Therefore, the load which acts on a motor for driving the second rollers 28 can be decreased and it is possible to make the size of motor compact. It is also possible to prevent the abrasion on the surface of the card 21, with which the counter members 23a and 23b and the plate member 24 are made contact. Furthermore, when the card 21 is inserted in the shuttle and removed therefrom, the plate member 24 is pushed down in connection with the movement of the first rollers 27. Therefore, it is unnecessary to provide a special means, such as an actuator, for pushing down the plate member 24, so that the size of the apparatus can be made compact.

As clear from FIG. 11, the flange portions 27b comprises tapered portions; and the tapered portions serve as a guide for guiding the card 21 when the card 21 is inserted into the shuttle and removed therefrom. Therefore, according to the first embodiment of the present invention, the card 21 can be inserted in the shuttle and removed therefrom in a certain manner.

As stated in the above, according to the first embodiment of the shuttle of the present invention, when the card 21 is inserted into the shuttle and removed therefrom, the condition that the card 21 is held between the plate member 24 and the counter members 23a and 23b is released in connection with the movement of the card feeding means. Therefore, the force necessary for inserting/removing the card into/from the shuttle becomes small and thus it is possible to make the size of the loading motor compact.

Further, the friction generated between the card 21 and the shuttle is remarkably decreased, so that it is possible to prevent the abrasion of the card 21. Furthermore, since the condition that the card 21 is held between the plate member 24 and the counter members 23a and 23b is released in connection with the movement of the card transferring, it is not necessary to provide a special means for releasing the condition, such as an actuator, and thus the construction of the apparatus can be made compact.

FIGS. 13 to 15 show a second embodiment of the shuttle according to the present invention; FIG. 13 is a perspective view showing the whole construction of the shuttle; FIG. 14 is a cross-sectional side view depicting the condition that the card 21 is mounted on the shuttle; and FIG. 15 is a cross-sectional side view illustrating the condition that the plate member 24 is lifted down.

In the second embodiment, the card 21 is inserted and removed with respect to the base 22; on the upper surface of the base 22 are provided counter members 23a and 23b for determining the position of the card 21. The counter members 23a and 23b are arranged to be separated from each other in a width direction in order to prevent the members from making contact with the information recording area of the card 21. On the lower surface of the counter members 23a, 23b, is provided a plate member 24 comprising a lever 24a via a flat spring 25. Further, on one of side walls of the base 22, there are provided elastic members 26a and 26b to determine the position of the card 21 in its width direction. Furthermore, on the opposite side of the card insertion side of the shuttle, projections 29a and 29b whose heights are a little bit smaller than the thickness of the card 21 are provided. It should be noted that the projections 29a and 29b are provided at both sides of the shuttle viewed from the card insertion direction.

When the card 21 is mounted on the shuttle, the card 21 is held between the counter members 23a and 23b and the plate member 24 with the aid of the flat spring 25. Recording and reproducing information on and from the card 21 is conducted under the condition, which is shown in FIG. 14, that the warp of the card 21 is corrected by the counter members 23a and 23b and the plate member 24 and the position of the card 21 is determined on the shuttle in its width direction by the elastic members 26a and 26b. When the card 21 is inserted in the shuttle and removed therefrom, the shuttle is fixed at a predetermined position of the apparatus by means of a locking mechanism (not shown); then the lever 24a is pushed down against the force of the flat spring 25, as shown in FIG. 15, to separate the plate member 24 from the counter members 23a and 23b at the card insertion side of the base 22; the condition that the card 21 is held between the counter members 23a and 23b and the plate member 24 is released by separating the plate member 24 from the counter members 23a and 23b; and then the card 21 is inserted into and removed from the shuttle by the rollers 30, which are arranged to be rotated by the loading motor (not shown).

In such construction of the shuttle, when the card 21 is inserted in the shuttle and removed therefrom, the plate member 24 is rotated about the projections 29a and 29b by being pressed down via the lever 24a as shown in FIG. 15, thus a space is formed between the plate member 24 and the counter members 23a and 23b. Since the height of the projections is a little bit smaller than the thickness of the card 21 to be inserted, the space having a thickness larger than the thickness of the card 21 would be formed between the plate member 24 and the counter members 23a and 23b almost through over the card 21 as a whole. Therefore, the card 21 can be certainly inserted in the shuttle or removed therefrom without giving an unnecessary load to the loading motor and without generating an abrasion on the card 21. Further, the pressing force of the elastic members 26a and 26b can be decreased. Furthermore, since the height of the projections 29a and 29b are arranged to be a little bit smaller than the thickness of the card 21 to be inserted, even after the lever 24a is released and the card 21 is mounted in the shuttle, the card 21 is held between the plate member 24 and the counter members 23a and 23b in an effective manner. Therefore, it is possible to keep the flatness of the card 21 during when the card 21 is mounted in the shuttle.

FIG. 16 is a cross sectional side view showing the third embodiment of the shuttle according to the present invention. In this embodiment, the projections 29a and 29b are arranged on the lower surfaces of the counter members 23a and 23b but the other construction is the same as that of the second embodiment. Therefore, the same effect as the second embodiment can be obtained. It should be noted that it is possible to arrange the projections 29a and 29b on both of the counter members 23a and 23b and the plate member 24.

As stated in the above, according to the second aspect of the invention, it is possible to form the space having its thickness larger than the thickness of the card to be mounted between the plate member 24 and the counter members 23a and 23b almost over the card 21 as a whole by a simple construction such that the projections having their height a little bit smaller than the thickness of the card 21 on at least one of the plate member and the counter members. Therefore, when the card 21 is inserted into the shuttle and removed therefrom, it is certainly possible to prevent to increase the load of the loading motor without increasing the weight of the apparatus; and possible to prevent the abrasion of the card 21 with a simple construction and a low cost.

What is claimed is:

1. An apparatus for mounting a card-like information recording medium for use in an information recording-/reproducing device, in which information is recorded on and/or reproduced from said card-like recording medium by effecting relative movement between said apparatus for mounting said card-like recording medium and an information recording/reproducing head in a reciprocal manner, comprising:

first and second feeding means for loading and unloading said card-like recording medium onto and from a given position in said information recording/reproducing device by moving said card-like recording medium in a first direction, each of said first and second feeding means being arranged rotatably about a rotation axis extending in a second direction which is perpendicular to said first direction, and one of said first and second feeding means being a movable feeding means which is arranged movably in a third direction which is perpendicular to a plane of said card-like recording medium;

moving means for moving said movable feeding means in said third direction when said card-like recording medium is inserted into or removed from said apparatus; and holding means for holding said card-like recording medium in a predetermined position in said apparatus by pressing said card-like recording medium in said third direction;

wherein when said card-like recording medium is inserted into or removed from said apparatus, said movable feeding means is brought into contact with said holding means such that a pressing operation of said holding means against said card-like recording medium is released.

2. An apparatus according to claim 1, wherein each of said first and second feeding means comprises a shaft extending in said second direction and at least one roller secured to said shaft.

3. An apparatus according to claim 2, wherein said at least one roller of said movable feeding means comprises a flange portion which is brought into contact with said holding means when said movable feeding means is moved in said third direction.

4. An apparatus according to claim 1, wherein said holding means comprises a pushing plate and a spring member for resiliently pressing said holding means against said card-like recording medium.

* * * * *